United States Patent
Wilairat et al.

(10) Patent No.: US 9,342,147 B2
(45) Date of Patent: May 17, 2016

(54) NON-VISUAL FEEDBACK OF VISUAL CHANGE

(71) Applicant: MICROSOFT TECHNOLOGY LICENSING, LLC, Redmond, WA (US)

(72) Inventors: Weerapan Wilairat, Sammamish, WA (US); Ibrahim Eden, Kirkland, WA (US); Vaibhav Thukral, Kirkland, WA (US); David Nister, Bellevue, WA (US); Vivek Pradeep, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 191 days.

(21) Appl. No.: 14/250,280

(22) Filed: Apr. 10, 2014

(65) Prior Publication Data

US 2015/0293587 A1 Oct. 15, 2015

(51) Int. Cl.
*G06F 3/01* (2006.01)
*H04N 7/18* (2006.01)
*G06Q 30/02* (2012.01)
*G06F 3/16* (2006.01)

(52) U.S. Cl.
CPC ............. *G06F 3/013* (2013.01); *G06F 3/165* (2013.01); *H04N 7/18* (2013.01)

(58) Field of Classification Search
CPC ............ G06F 3/013; G06F 3/165; H04N 7/18
USPC .......................................................... 348/143
See application file for complete search history.

(56) References Cited

U.S. PATENT DOCUMENTS

| 7,561,143 B1 | 7/2009 | Milekic |
| 2005/0047629 A1 | 3/2005 | Farrell et al. |

(Continued)

FOREIGN PATENT DOCUMENTS

| WO | 2012162060 A2 | 11/2012 |
| WO | 2013036237 A1 | 3/2013 |

OTHER PUBLICATIONS

ISA European Patent Office, International Search Report and Written Opinion Issued in Application No. PCT/US2015/024409, Jul. 8, 2015, WIPO, 10 pages.

(Continued)

*Primary Examiner* — Hee-Yong Kim
(74) *Attorney, Agent, or Firm* — Dave Ream; Tom Wong; Micky Minhas

(57) ABSTRACT

Examples relating to using non-visual feedback to alert a viewer of a display that a visual change has been triggered are disclosed. One disclosed example provides a method comprising using gaze tracking data from a gaze tracking system to determine that a viewer changes a gaze location. Based on determining that the viewer changes the gaze location, a visual change is triggered and non-visual feedback indicating the triggering of the visual change is provided to the viewer. If a cancel change input is received within a predetermined timeframe, the visual change is not displayed. If a cancel change input is not received within the timeframe, the visual change is displayed via the display.

20 Claims, 7 Drawing Sheets

(56) References Cited

U.S. PATENT DOCUMENTS

| | | | |
|---|---|---|---|
| 2006/0256133 A1 | 11/2006 | Rosenberg | |
| 2012/0272179 A1 | 10/2012 | Stafford | |
| 2013/0235347 A1 | 9/2013 | Hennessey et al. | |
| 2013/0259312 A1 | 10/2013 | Lyons et al. | |
| 2013/0293530 A1* | 11/2013 | Perez | G06K 9/00671 345/418 |
| 2013/0307771 A1* | 11/2013 | Parker | G06F 3/013 345/158 |
| 2013/0321265 A1 | 12/2013 | Bychkov et al. | |
| 2014/0071349 A1 | 3/2014 | Ramo et al. | |

OTHER PUBLICATIONS

Kumar, Manu et al., "EyeExpose: Switching Applications with Your Eyes." Feb. 2007, 7 pages.

Poitschke, Tony et al., "Gaze-based interaction on multiple displays in an automotive environment." IEEE International Conference on Systems, Man, and Cybernetics (SMC), Oct. 2011, pp. 543-548.

Zhu, Zhiwei et al., "Eye and gaze tracking for interactive graphic display." Machine Vision and Applications, vol. 15, No. 3, Jun. 8, 2004, pp. 139-148.

* cited by examiner

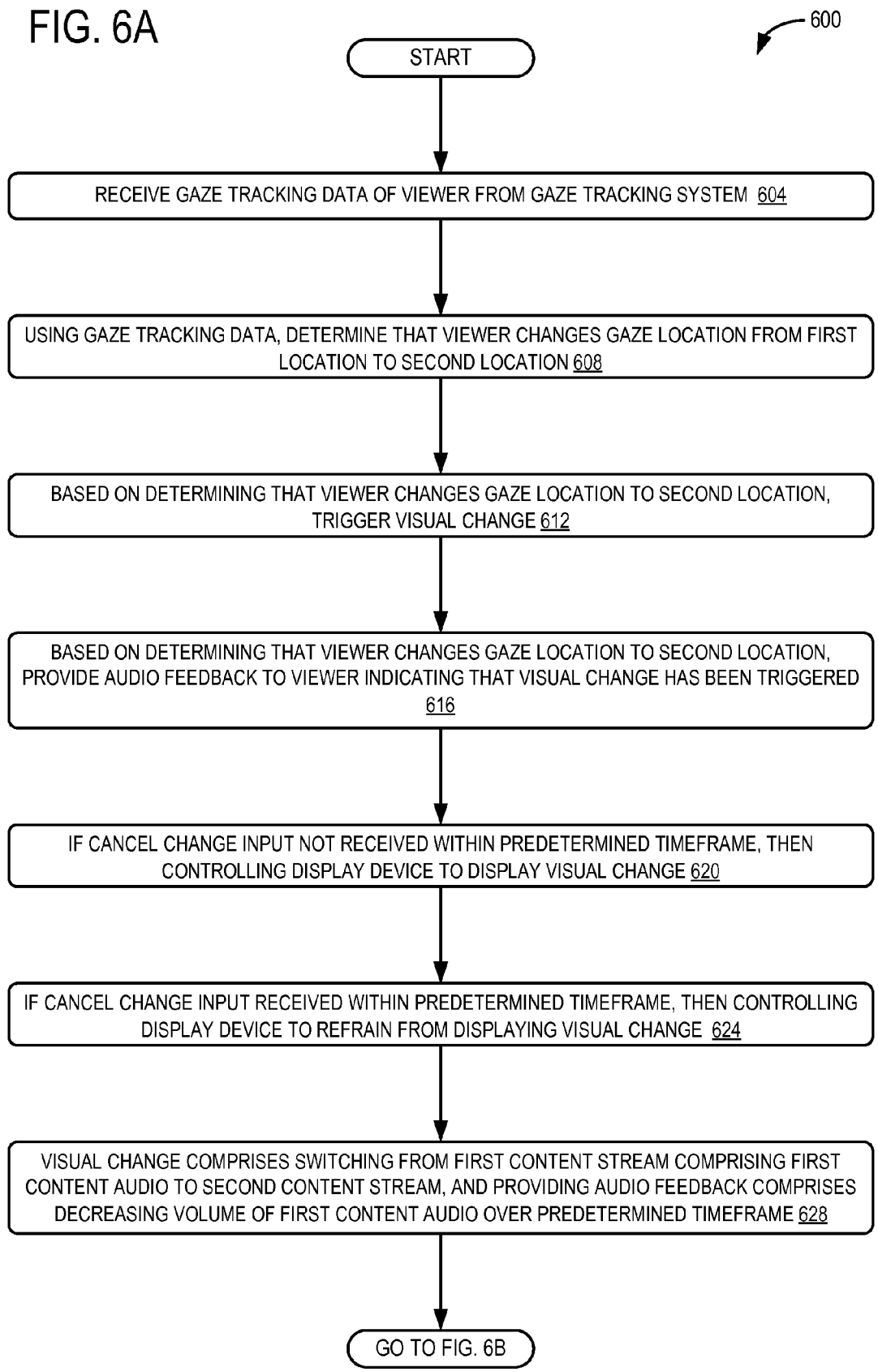

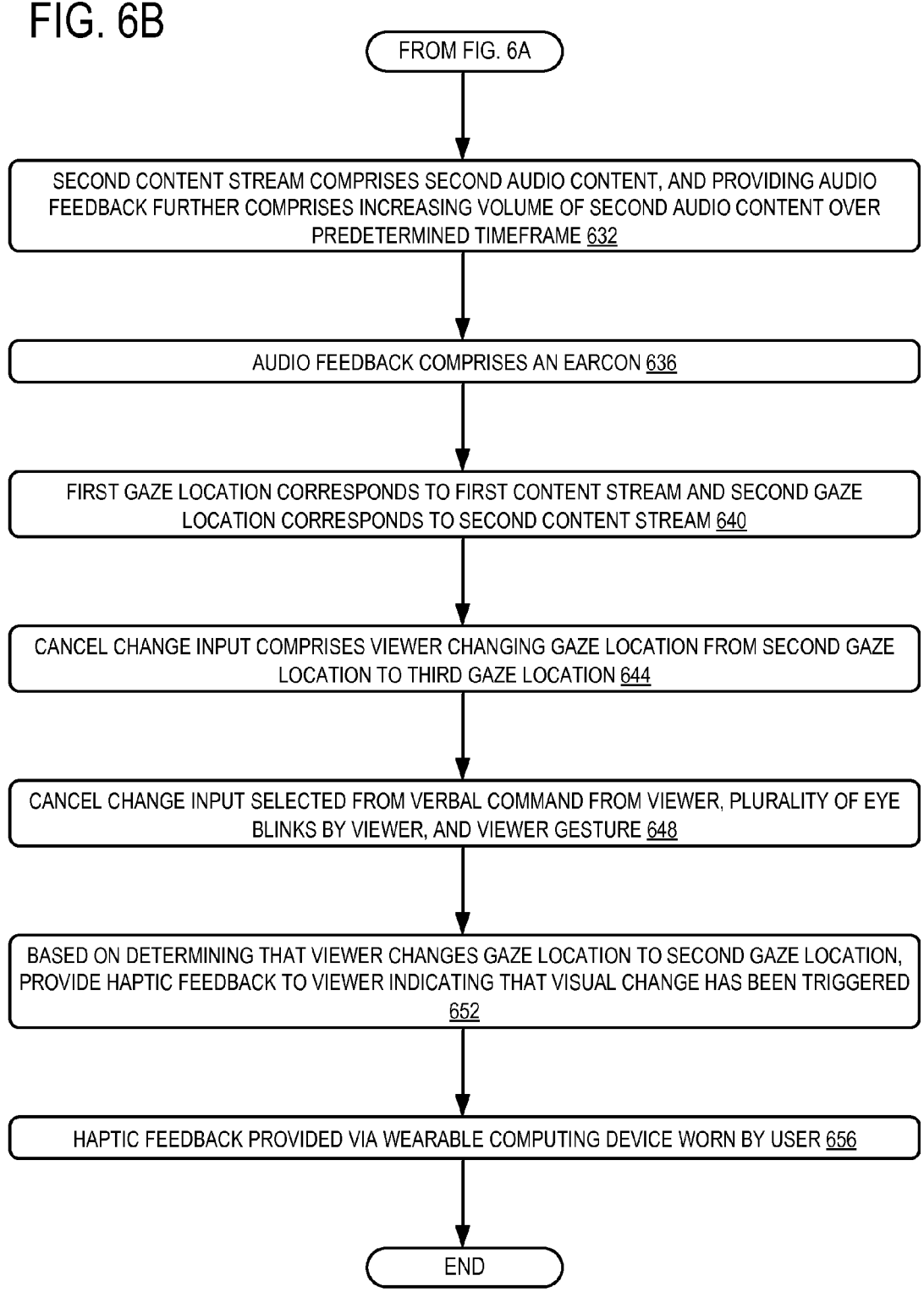

NON-VISUAL FEEDBACK OF VISUAL CHANGE

BACKGROUND

Content creation and/or delivery devices may utilize gaze tracking systems to enable a user to interact with the devices via the user's gaze. In some examples, a user may switch between two or more different user interfaces and/or content streams, delivered by a single device or multiple devices, by changing a location of the user's gaze.

In one example, a user may be interested in two football games and may display both games on a single television. A first game may be displayed in the entire television screen, while the second game is displayed in a smaller inset window near one corner of the screen (such as a "picture-in-picture" feature). The user's gaze location may determine which of the two games occupies the entire screen. Accordingly, when the user looks at the second game displayed in the inset window, that content stream may be enlarged to occupy the entire screen. The content stream of the first game then may be displayed in the smaller inset window.

Movement of a user's eyes, however, may not always correspond to a user's intention to control such a device. For example, a flash of light or other visual distraction in the game displayed in the inset window may cause the user to glance at the window. The displays of the two football games may then be switched, despite the user having no intention to perform such a switch.

SUMMARY

Various embodiments are disclosed herein that relate to using non-visual feedback to alert a viewer of a display device that a visual change in the display device has been triggered. For example, one disclosed embodiment provides, in a computing device, a method comprising receiving gaze tracking data of the viewer from a gaze tracking system. Using the gaze tracking data, it is determined that the viewer changes a gaze location from a first gaze location to a second gaze location.

Based on determining that the viewer changes the gaze location to the second gaze location, a visual change is triggered and non-visual feedback indicating that the visual change has been triggered is provided to the viewer. If a cancel change input is received within a predetermined timeframe, then the visual change is not displayed via the display device. If a cancel change input is not received within the predetermined timeframe, then the visual change is displayed via the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A and 6B are a flow chart of a method for using non-visual feedback to alert a viewer of a display device that a visual change in the display device has been triggered according to an example of the present disclosure.

DETAILED DESCRIPTION

Figure 1:
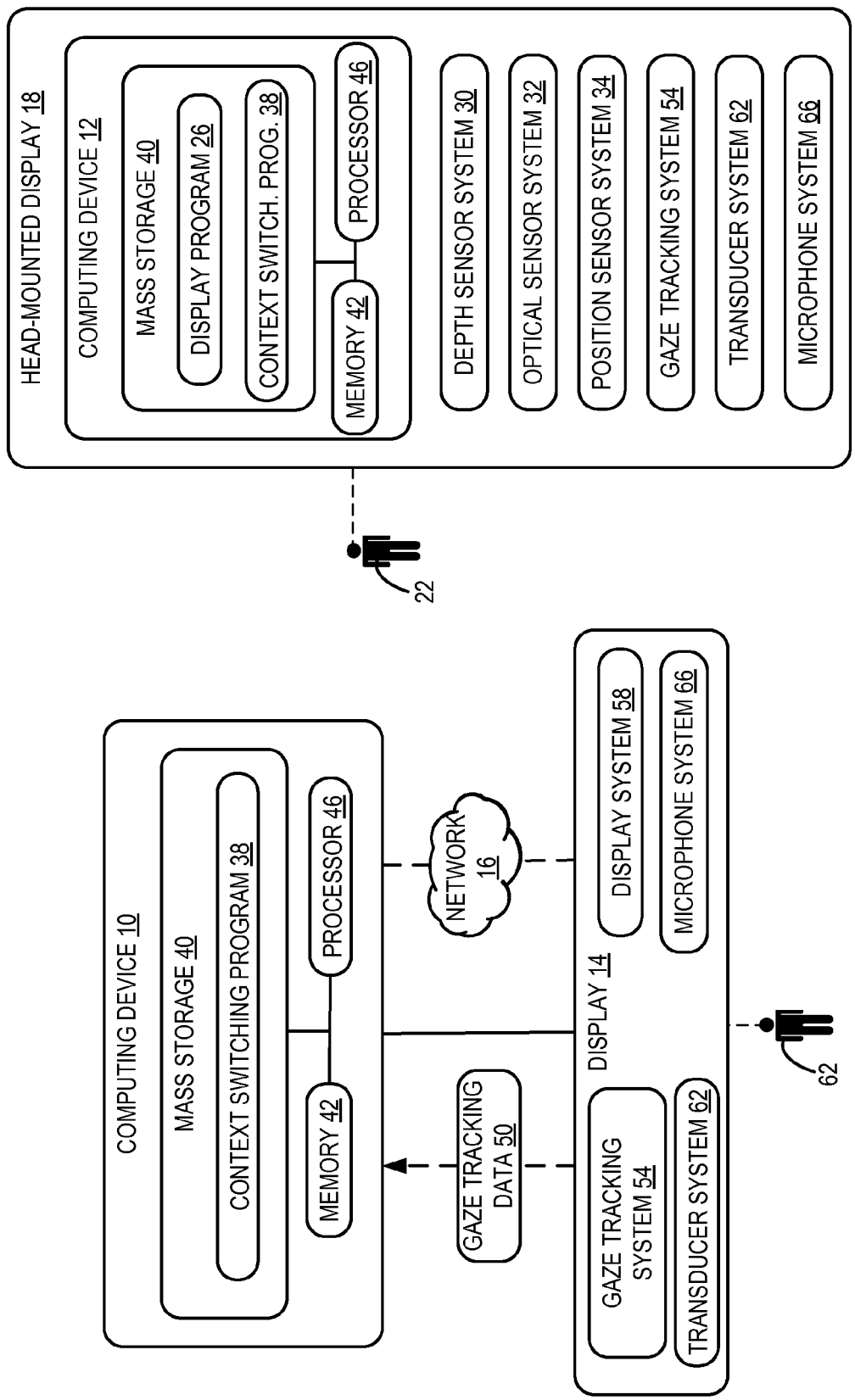
FIG. 1 is a schematic view of computing devices that use non-visual feedback to alert a viewer of a display device that a visual change has been triggered according to examples of the present disclosure.

FIG. 1 shows a schematic view of example implementations of a computing device for providing non-visual feedback to alert a viewer of a display device that a visual change in the display device has been triggered. As described in more detail below, the computing device uses gaze tracking data to determine that the viewer changes his or her gaze location. A visual change is triggered and non-visual feedback is provided to the viewer indicating that the change has been triggered. If the viewer provides a cancel change input within a predetermined timeframe, then the visual change is not displayed. If the viewer does not provide a cancel change input within the timeframe, then the visual change is displayed.

In various examples, the computing device may be either physically separated from or integrated into a display device with which a viewer may interact. FIG. 1 schematically shows an example of a computing device 10 that is physically separated from a display device 14. In this example, the computing device 10 may comprise or be integrated into a separate device, such as a set-top box, gaming console, web camera, wearable device, head-mounted computing device or other wearable computing device, keyboard, dedicated peripheral, or other like device that does not include an integrated display.

The computing device 10 may be operatively connected with the display device 14 using a wired connection, or may employ a wireless connection via WiFi, Bluetooth, or any other suitable wireless communication protocol. For example, the computing device 10 may be communicatively coupled to a network 16. The network 16 may take the form of a local area network (LAN), wide area network (WAN), wired network, wireless network, personal area network, or a combination thereof, and may include the Internet. Additional details regarding the components and computing aspects of the computing device 10 are described in more detail below with reference to FIG. 7.

FIG. 1 also shows an example of a computing device 12 integrated into a head-mounted display (HMD) device 18. The HMD device 18 may create and display to a first viewer 22 a virtual reality environment or a mixed reality environment. In these examples, the HMD device 18 may include a display program 26 that may generate the virtual environment or mixed reality environment for display via HMD device. The virtual environment may include one or more visual elements in the form of virtual images, such as three-dimensional (3D) holographic objects and two-dimensional (2D) virtual images, that are generated and displayed via HMD device 18. In a mixed reality environment, the HMD device 18 may enable the viewer to view such virtual images within the physical environment surrounding the viewer.

In some examples, the HMD device 18 may comprise a transparent, semi-transparent or non-transparent display that is supported in front of a viewer's eye or eyes. The HMD device 18 may include various sensors and related systems that receive physical environment data from a physical environment. For example, the HMD device 18 may include a depth sensor system 30 that includes one or more depth cameras that generate depth image data.

In some examples the HMD device 18 may include an optical sensor system 32 that utilizes at least one outward facing sensor, such as an RGB camera or other optical sensor. The outward facing sensor may capture two-dimensional image information from the physical environment. The HMD device 18 may also include a position sensor system 34 comprising one or more accelerometers, gyroscopes, head tracking systems, and/or other sensors for determining a position or orientation of a user.

Additionally, the example illustrated in FIG. 1 shows the computing device 12 integrated into the HMD device 18. It will be appreciated that in other examples the computing device 12 may be a separate component from the HMD device 18. Many types and configurations of HMD devices 18 having various form factors may be used and are within the scope of the present disclosure.

It also will be appreciated that the computing device 12 may comprise or be integrated into any other suitable type or form of display device, such as a tablet, notebook, smartphone, or other mobile computing device, desktop computing device, standalone monitor, wall-mounted display, interactive whiteboard, or other like device having an integrated display.

Both computing device 10 and computing device 12 may include a context switching program 38 that may be stored in mass storage 40. The context switching program 38 may be loaded into memory 42 and executed by a processor 46 to perform one or more of the methods and processes described in more detail below.

Computing device 10 and computing device 12 may receive gaze tracking data 50 from a gaze tracking system 54. In various examples the gaze tracking system 54 may be located in display device 14, HMD device 18, or in a common enclosure with any other suitable type or form of display device, including but not limited to those example devices having an integrated display discussed above. In other examples, the gaze tracking system 54 and computing device 10 may be integrated into a common enclosure that does not include an integrated display, such as a head-mounted or other wearable device, or in any other suitable type or form of computing device that does not include an integrated display, including but not limited to those example devices without an integrated display discussed above.

With continued reference to FIG. 1, the example display device 14 may include a display system 58 for presenting one or more visual elements to a second viewer 62. As described in more detail below, the context switching program 38 may utilize gaze tracking data 50 from a gaze tracking system 54 to trigger a visual change in the one or more visual elements displayed to the second viewer 62 via the display device 14. Similarly, in the example HMD device 18 the context switching program 38 may utilize gaze tracking data from gaze tracking system 54 in the HMD device to trigger a visual change in one or more visual elements displayed to the first viewer 22 via the HMD device.

The display 14 and HMD device 18 may also include a transducer system 62 comprising one or more actuators that convert an electrical signal into another form of energy. In some examples, the transducer system 62 may include one or more speakers for generating audio feedback to a viewer. In other examples, the one or more speakers may take the form of headphones or in-ear ear buds worn by the viewer. In other examples the transducer system 62 may include one or more tactile transducers for generating haptic feedback to the viewer, such as vibrations.

The display 14 and HMD device 18 may also include a microphone system 66 and one or more microphones for receiving audio input from the physical environment. In some examples, a microphone array that includes a plurality of microphones may be provided. The microphones may comprise omnidirectional microphones and/or unidirectional microphones that are configured to receive speech from the viewer and other audio inputs from the physical environment.

Figure 2:
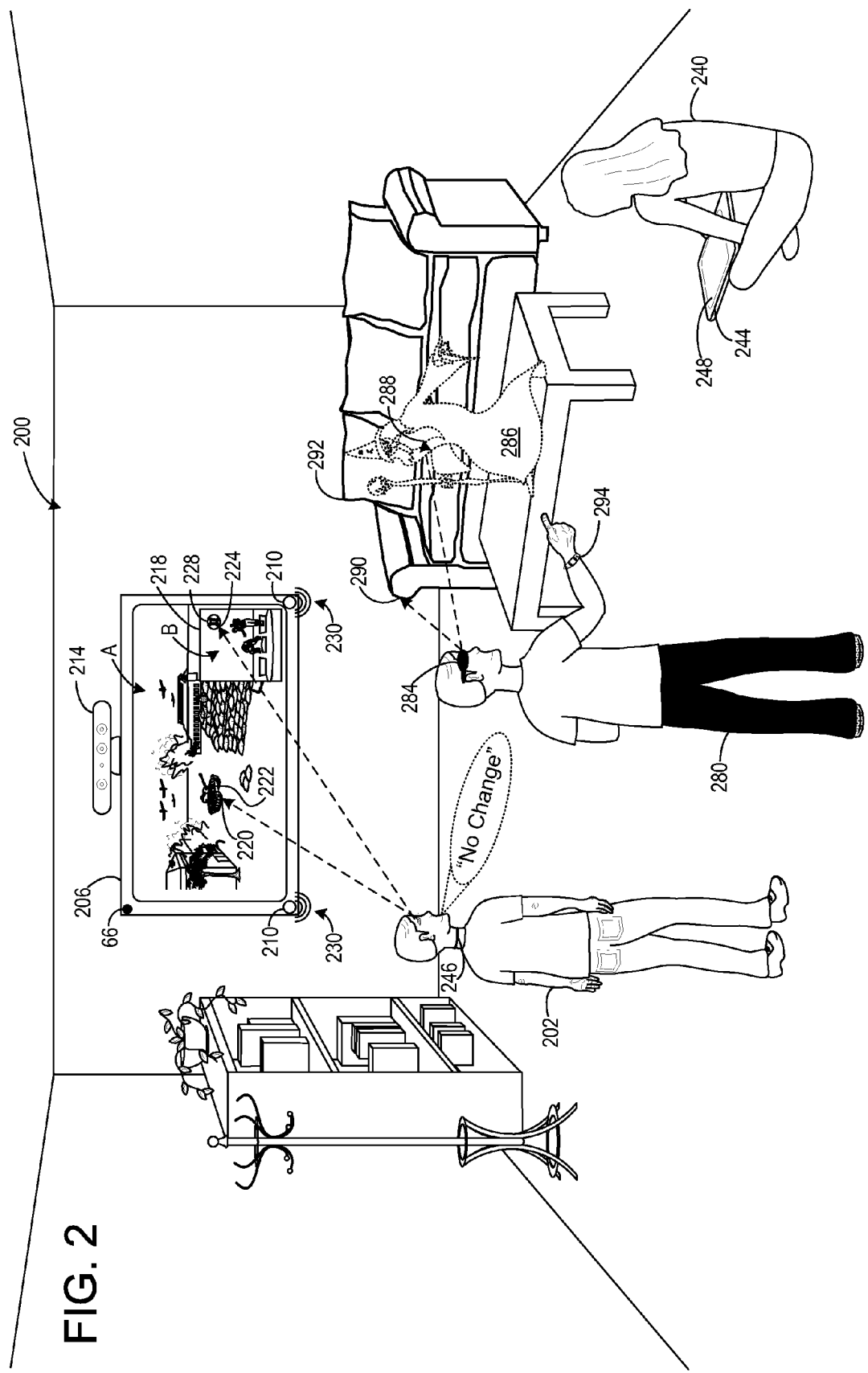
FIG. 2 is a schematic illustration of several viewers in a room interacting with computing devices and displays that use non-visual feedback to alert a viewer that a visual change has been triggered according to examples of the present disclosure.
Figure 3:
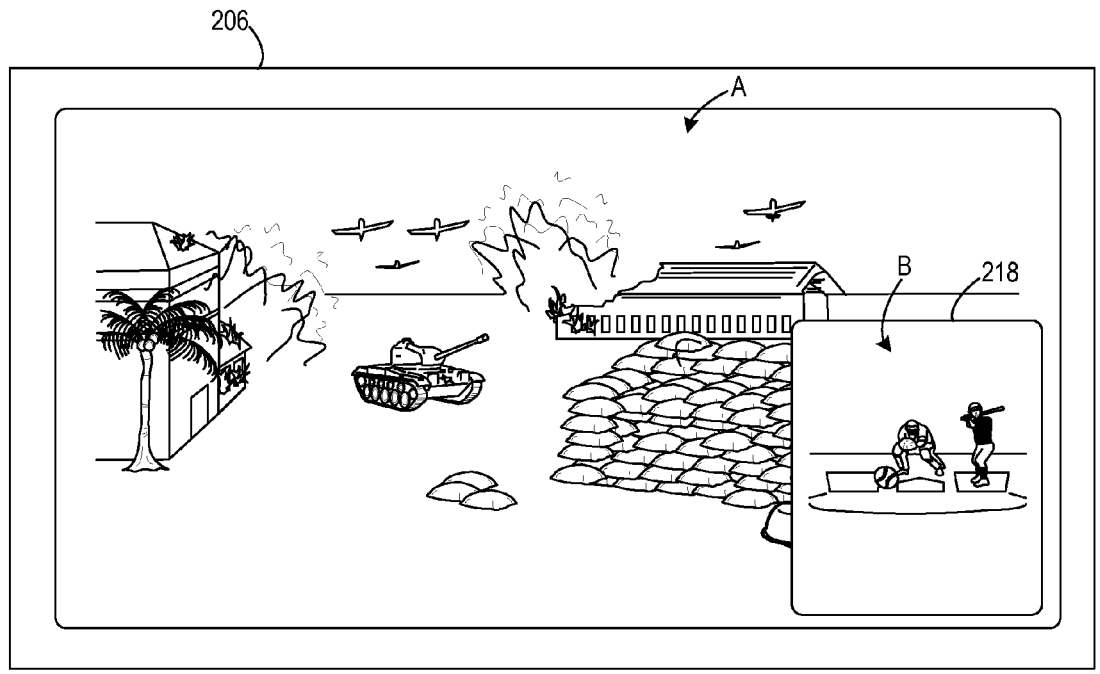
FIGS. 3 and 4 are schematic illustrations of a display device displaying a visual change triggered by a viewer changing a gaze location according to an example of the present disclosure.
Figure 4:
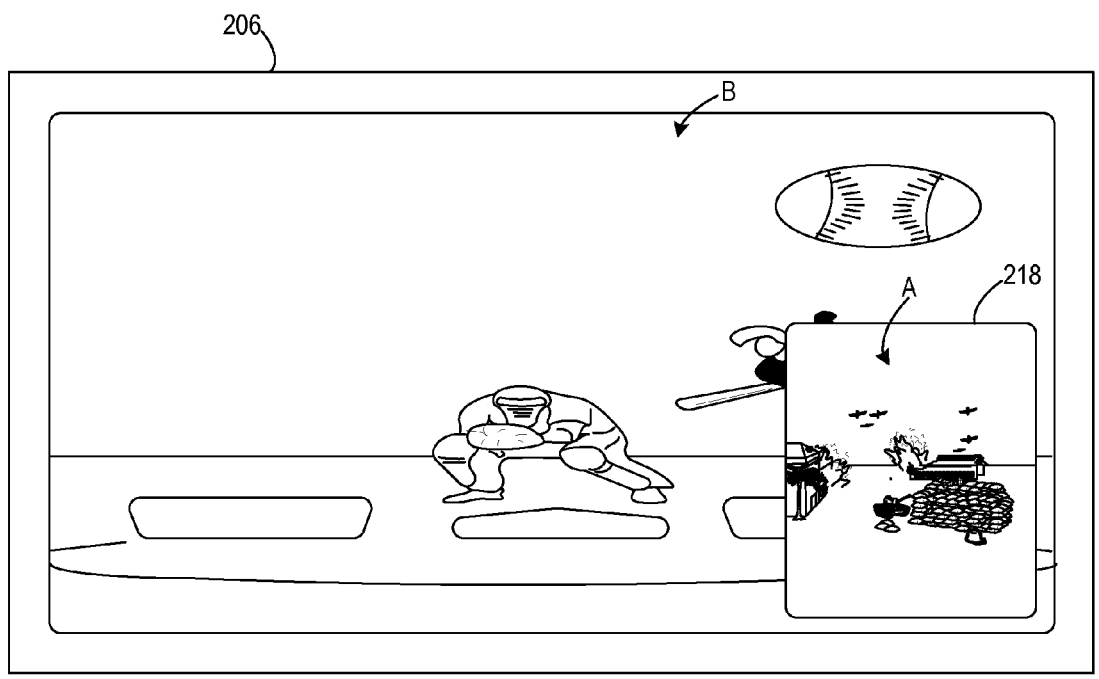

With reference now to FIGS. 2-4, descriptions of example use cases will now be provided. FIG. 2 is a schematic illustration of several viewers in a room 200 interacting with computing and display devices that use non-visual feedback to alert a viewer that a visual change has been triggered. In one example, viewer Bob 202 is watching movie A that is displayed in a viewing format covering substantially the entire screen of wall-mounted display 206. Movie A comprises a content stream that includes Movie A audio which is broadcast through speakers 210 of the display 206.

Viewer Bob 202 is also interested in baseball game B that is being broadcast on another channel. Baseball game B comprises another content stream that includes baseball game B audio. To keep his eye on the game, viewer Bob 202 engages the picture-in-picture feature of display 206 to also display the baseball game B in a smaller inset window 218 near a bottom right corner of the screen. As the baseball game B is selected for display in the smaller inset window 218, the baseball game B audio is not broadcast via speakers 210. A set-top box 214 that is communicatively coupled to the display 206 includes a computing device 10, context switching program 38 and a gaze tracking system 54 that tracks the location of the gaze of viewer Bob 202 and generates corresponding gaze tracking data.

At an initial time and as determined by the gaze tracking system 54, the gaze of viewer Bob 202 is located at a first location 220 on the screen of display 206 that corresponds to tank 222 in the Movie A. Curious about baseball game B, viewer Bob 202 shifts his gaze to a second location 224 on the screen that corresponds to a baseball 228 in flight in the baseball game B displayed in the smaller inset window 218.

Using gaze tracking data from the gaze tracking system 54, the context switching program 38 determines that viewer Bob 202 has changed his gaze location to the second location 224 in the inset window 218. Based on this change in gaze location to a location corresponding to the baseball game B, the context switching program 38 triggers a visual change in the content being displayed by the wall-mounted display 206. For purposes of this disclosure, triggering a visual change means initiating a predetermined timeframe and at the expiration of the timeframe either displaying or not displaying the visual change, depending upon whether a cancel change input is received from the viewer. The predetermined timeframe may have any suitable temporal length. Non-limiting examples of the predetermined timeframe include 0.5 seconds, 1.0 second, 2.0 seconds, 3.0 seconds, 5.0 seconds, 10.0 seconds, or any other suitable timeframe.

In the present example and with reference now to FIGS. 3 and 4, the visual change comprises swapping the viewing formats of the baseball game B and Movie A. Alternatively expressed and as shown in FIG. 4, the visual change comprises displaying the baseball game B on substantially the entire screen of display 206 and displaying Movie A in the smaller inset window 218.

When viewer Bob 202 changes his gaze location to the second location 224, he may or may not desire to swap the viewing formats of the baseball game B and Movie A. For example, viewer Bob 202 may want to simply see the score of the game and then continue watching Movie A. Accordingly, and based on determining that viewer Bob 202 changes his gaze location to the second location 224, audio feedback 230 is provided to viewer Bob via speakers 210, with the audio feedback indicating that the visual change has been triggered. Advantageously, the audio feedback 230 alerts viewer Bob 202 that the viewing formats of the baseball game B and Movie A will be swapped at the expiration of the predetermined timeframe, unless viewer Bob provides a cancel change input.

As described in more detail below, if viewer Bob 202 does not want to swap the viewing formats of the baseball game B and Movie A, he can provide a cancel change input. If he provides a cancel change input before the expiration of the predetermined timeframe, then the context switching program 38 controls the display 206 to maintain the current viewing formats of the baseball game B and Movie A, and correspondingly refrain from swapping the viewing formats.

In some examples, the audio feedback 230 may comprise decreasing the volume of the Movie A audio over the predetermined timeframe. At the end of the predetermined timeframe, the Movie A audio volume may be completely muted or may be simply lower than at the beginning of the predetermined timeframe. In other examples, the audio feedback may comprise increasing the volume of the baseball game B audio over the predetermined timeframe. In some examples, the Movie A audio volume may be decreased and the baseball game B audio volume may be increased over the predetermined timeframe.

In other examples, the audio feedback may comprise an earcon. The earcon may comprise one or more distinctive sounds including, but not limited to, a beeping sound, a multi-tone melody, a sound pattern, a recorded sound from nature, or other suitable sound. In some examples the audio feedback may comprise a human voice providing a verbal alert. For example, the human voice may provide a countdown to the display of the visual change, such as "Content swapping in 3, 2, 1."

As noted above, if viewer Bob 202 does not want to swap the current viewing formats of the baseball game B and Movie A, he can provide a cancel change input before the predetermined timeframe expires. In some examples the cancel change input may comprise audio input provided by the viewer. Examples of such audio input may include, but are not limited to, one or more spoken words, sounds other than spoken words that are voiced by the viewer, and non-vocal sounds made or generated by the viewer such as, for example, clapping hands, snapping fingers, and generating sound with a mechanical, electronic, or other device.

In the example of FIG. 2, viewer Bob 202 may provide a cancel change input in the form of the spoken words "No change" before the predetermined timeframe expires. The spoken words are received by a microphone 66 on the display 206. Accordingly and in response to receiving the cancel change input from viewer Bob 202 before the predetermined timeframe expires, the context switching program 38 controls the display device 206 to refrain from swapping the viewing formats of the baseball game B and Movie A, and therefore maintain the viewing formats shown in FIGS. 2 and 3.

On the other hand, if viewer Bob 202 desires to swap the viewing formats, then he may simply refrain from providing the cancel change input. In this example, at the expiration of the predetermined timeframe the context switching program 38 controls the display 206 to swap the viewing formats of the baseball game B and Movie A, as shown in FIG. 4. It will be appreciated that in some examples the visual change of swapping of the viewing formats may comprise a single, substantially instantaneous switch of the formats at the expiration of the predetermined timeframe. In other examples the visual change may comprise, at the expiration of the predetermined timeframe, displaying the baseball game B on substantially the entire screen of display 206 and displaying Movie A in the smaller inset window 218. In these examples the visual change may be preceded by an animated transition in which the display format of the baseball game B is enlarged while the display format of the movie A is shrunken.

In another example, the cancel change input may comprise viewer Bob 202 changing his gaze location from the second location 224 corresponding to the baseball game B to a third gaze location that does not correspond to the baseball game B. For example, the third gaze location may comprise any location outside of the inset window 218 in which the baseball game B is displayed.

Figure 5:
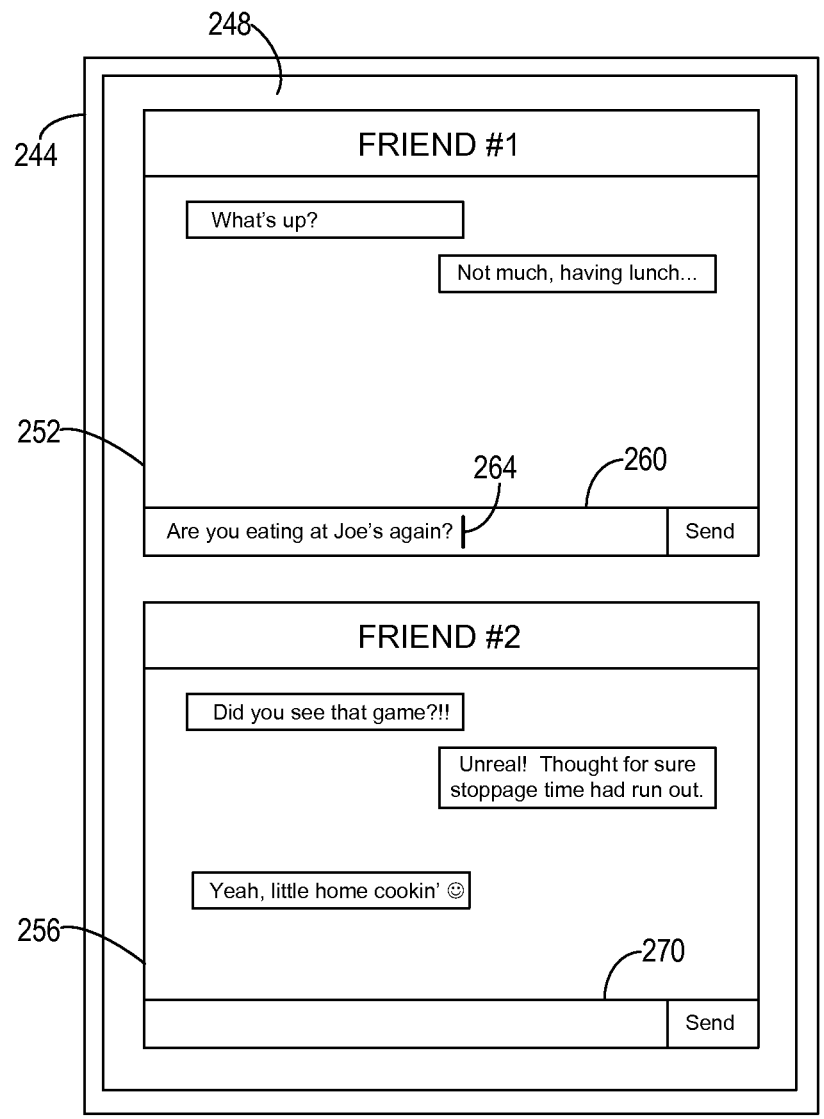
FIG. 5 is a schematic illustration of two chat windows displayed on a computing device display.

In other examples, the cancel change input may comprise a plurality of eye blinks from the viewer. For example and with reference to FIGS. 2 and 5, viewer Ann 240 may be chatting with two friends via her tablet 244. Displayed on the screen 248 of the tablet 244 are a first chat window 252 and a second chat window 256. A gaze tracking system 54 of the tablet 244 may determine that Ann is gazing at a location within the first chat window 252, such as the first text entry box 260. A blinking cursor 264 may be displayed in the first text entry box 260, indicating that this box has focus and may receive text input. Upon determining that viewer Ann 240 changes her gaze location to a location within the second chat window 256, a visual change may be triggered and non-visual feedback may be provided via the tablet 244 to viewer Ann 240 indicating that the visual change has been triggered.

If viewer Ann 240 does not provide a cancel change input within a predetermined timeframe, then the tablet 244 may display the visual change, such as moving the blinking cursor 264 from the first text entry box 260 to the second text entry box 270 in the second chat window 256. If viewer Ann 240 does not desire to switch the blinking cursor to the second text entry box 270, she may provide a cancel change input comprising a plurality of eye blinks within predetermined timeframe. In one example, the cancel change input may comprise three eye blinks within 0.5 seconds. It will be appreciated that any suitable number of eye blinks coupled with any suitable predetermined timeframe may be used for a cancel change input.

In other examples, the cancel change input may comprise a gesture performed by the viewer. For example and with reference again to FIG. 2, viewer Del 280 may be wearing an HMD device in the form factor of glasses 284. Viewer Del 280 may be playing a game involving the display of a holographic wizard 286 by the HMD glasses 284. The holographic wizard 286 is displayed at Del's current gaze location 288, as determined by a gaze tracking system 54 in the HMD glasses 284. Upon determining that viewer Del 280 changes his gaze location to an arm 290 of the couch 292, a visual change may be triggered and non-visual feedback may be provided via the HMD glasses 284 to viewer Del 280 indicating that the visual change has been triggered.

If viewer Del 280 does not provide a cancel change input within a predetermined timeframe, then the HMD glasses 284 may move the display of the wizard 286 to the arm 290 of the couch 292. If viewer Del 280 does not desire to move the location of the wizard 286, he may provide a cancel change input comprising a gesture. As shown in FIG. 2, in one example, the cancel change input may comprise viewer Del 280 pointing at the current location of the wizard 286. It will be appreciated that any suitable gesture, including but not limited to movement by a viewer's head, face, one or more hands, fingers, arms, legs, and/or feet, or any other bodily movement, may be utilized as a cancel change input.

In other examples, other forms of non-visual feedback may be provided to a viewer to indicate that a visual change has been triggered. In some examples, haptic feedback provided by a wearable device worn by a viewer, a hand held device held by a viewer, and/or furniture or other objects with which a viewer interacts may be utilized. With reference again to FIG. 2, for example, haptic feedback may be provided to viewer Del 280 via vibrations generated by HMD glasses 284 and/or a watch 294. Similarly, haptic feedback may be provided to viewer Bob 202 via vibrations generated by necklace 246, or to viewer Ann via vibrations generated by tablet 244. It will be appreciated that many other examples and form factors of wearable devices capable of providing haptic feedback may be utilized and are within the scope of the present disclosure.

FIGS. 6A and 6B illustrate a flow chart of a method 600 for using non-visual feedback to alert a viewer of a display device that a visual change in the display device has been triggered according to an implementation of the present disclosure. The following description of method 600 is provided with reference to the software and hardware components described above and shown in FIGS. 1-5. It will be appreciated that method 600 may also be performed in other contexts using other suitable hardware and software components.

With reference to FIG. 6A, at 604 the method 600 may include receiving gaze tracking data of the viewer from a gaze tracking system. At 608 the method 600 may include, using the gaze tracking data, determining that the viewer changes a gaze location from a first gaze location to a second gaze location. At 612 the method 600 may include, based on determining that the viewer changes the gaze location to the second gaze location, triggering the visual change. At 616 the method 600 may include, based on determining that the viewer changes the gaze location to the second gaze location, providing the audio feedback to the viewer indicating that the visual change has been triggered.

At 620 the method 600 may include, if a cancel change input is not received within a predetermined timeframe, controlling the display device to display the visual change. At 624 the method 600 may include, if the cancel change input is received within the predetermined timeframe, controlling the display device to refrain from displaying the visual change. At 628 the visual change may comprise switching from a first content stream comprising first content audio to a second content stream, and providing the audio feedback may comprise decreasing a volume of the first content audio over the predetermined timeframe.

With reference now to FIG. 6B, at 632 a second content stream may comprise second content audio, and providing the audio feedback may further comprise increasing a volume of the second content audio over the predetermined timeframe. At 636 the audio feedback may comprise an earcon. At 640 the first gaze location may correspond to a first content stream and the second gaze location may correspond to a second content stream. At 644 the cancel change input may comprise the viewer changing the gaze location from the second gaze location to a third gaze location. At 648 the cancel change input may be selected from the group consisting of a verbal command from the viewer, a plurality of eye blinks by the viewer, and a viewer gesture.

At 652 the method 600 may include, based on determining that the viewer changes the gaze location to the second gaze location, providing haptic feedback to the viewer indicating that the visual change has been triggered. At 656 the haptic feedback may be provided via a wearable computing device worn by the viewer.

It will be appreciated that method 600 is provided by way of example and is not meant to be limiting. Therefore, it is to be understood that method 600 may include additional and/or alternative steps than those illustrated in FIGS. 6A and 6B. Further, it is to be understood that method 600 may be performed in any suitable order. Further still, it is to be understood that one or more steps may be omitted from method 600 without departing from the scope of this disclosure.

Figure 7:
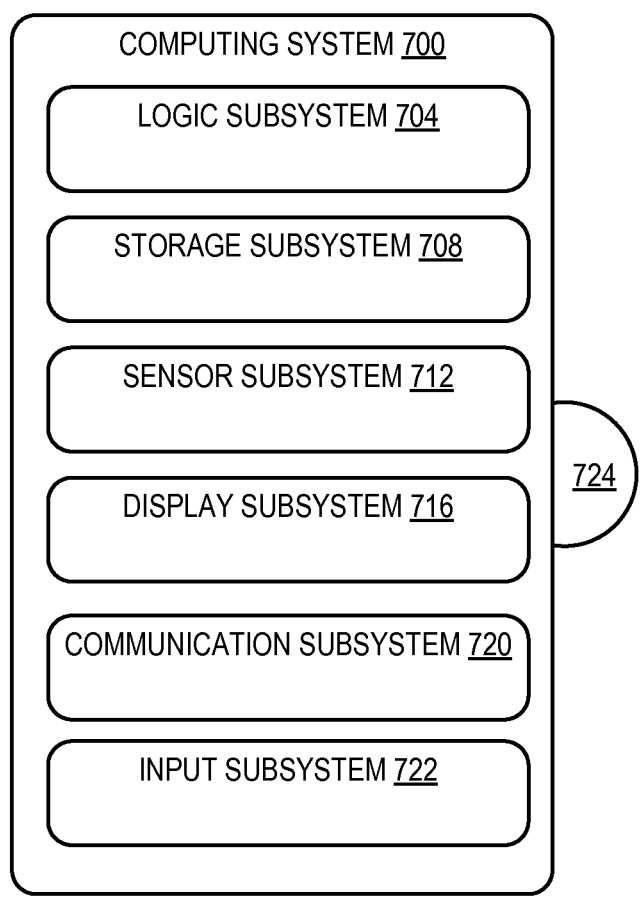
FIG. 7 is a simplified schematic illustration of an example of a computing device.

FIG. 7 schematically shows a nonlimiting example of a computing system 700 that may perform one or more of the above described methods and processes. Computing device 10 and computing device 12 may take the form of or include one or more aspects of computing system 700. Computing system 700 is shown in simplified form. It is to be understood that virtually any computer architecture may be used without departing from the scope of this disclosure. In different embodiments, computing system 700 may take the form of a mainframe computer, server computer, desktop computer, tablet computer, home entertainment computer, network computing device, tablet, notebook, smartphone, or other mobile computing device, mobile communication device, gaming device, etc.

As shown in FIG. 7, computing system 700 includes a logic subsystem 704 and a storage subsystem 708. Computing system 700 may optionally include a sensor subsystem 712, display subsystem 716, communication subsystem 720, input subsystem 722 and/or other subsystems and components not shown in FIG. 7. Computing system 700 may also include computer readable media, with the computer readable media including computer readable storage media and computer readable communication media. Computing system 700 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 704 may include one or more physical devices configured to execute one or more instructions. For example, the logic subsystem 704 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 704 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 708 may include one or more physical, persistent devices configured to hold data and/or instructions executable by the logic subsystem 704 to implement the herein described methods and processes. When such methods and processes are implemented, the state of storage subsystem 708 may be transformed (e.g., to hold different data).

Storage subsystem 708 may include removable media and/or built-in devices. Storage subsystem 708 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 708 may include devices with one or more of the following characteristics: volatile, nonvolatile, dynamic, static, read/write, read-only, random access, sequential access, location addressable, file addressable, and content addressable.

In some examples, aspects of logic subsystem 704 and storage subsystem 708 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 7 also shows an aspect of the storage subsystem 708 in the form of removable computer readable storage media 724, which may be used to store data and/or instructions executable to implement the methods and processes described herein. Removable computer-readable storage media 724 may take the form of CDs, DVDs, HD-DVDs, Blu-Ray Discs, EEPROMs, and/or floppy disks, among others.

It is to be appreciated that storage subsystem 708 includes one or more physical, persistent devices. In contrast, in some implementations aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, sensor subsystem 712 may include one or more sensors configured to sense different physical phenomenon (e.g., visible light, infrared light, sound, acceleration, orientation, position, etc.) as described above. Sensor subsystem 712 may be configured to provide sensor data to logic subsystem 704, for example. Such data may include gaze tracking information, image information, ambient lighting information, depth information, audio information, position information, motion information, user location information, and/or any other suitable sensor data that may be used to perform the methods and processes described above.

When included, display subsystem 716 may be used to present a visual representation of data held by storage subsystem 708. As the above described methods and processes change the data held by the storage subsystem 708, and thus transform the state of the storage subsystem, the state of the display subsystem 716 may likewise be transformed to visually represent changes in the underlying data. The display subsystem 716 may include one or more display devices utilizing virtually any type of technology. Such display devices may be combined with logic subsystem 704 and/or storage subsystem 708 in a shared enclosure, or such display devices may be peripheral display devices.

When included, communication subsystem 720 may be configured to communicatively couple computing system 700 with one or more networks and/or one or more other computing devices. Communication subsystem 720 may include wired and/or wireless communication devices compatible with one or more different communication protocols. As nonlimiting examples, the communication subsystem 720 may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

When included, input subsystem 722 may comprise or interface with one or more sensors or user-input devices such as a game controller, gesture input detection device, voice recognizer, inertial measurement unit, keyboard, mouse, or touch screen. In some embodiments, the input subsystem 722 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of computing device 10 and computing device 12 that is implemented to perform one or more particular functions. In some cases, such a program may be instantiated via logic subsystem 704 executing instructions held by storage subsystem 708. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device, a method for using audio feedback to alert a viewer of a display device that a visual change in the display device has been triggered, the method comprising:

receiving gaze tracking data of the viewer from a gaze tracking system;

using the gaze tracking data, determining that the viewer changes a gaze location from a first gaze location to a second gaze location;

based on determining that the viewer changes the gaze location to the second gaze location, triggering the visual change;

based on determining that the viewer changes the gaze location to the second gaze location, providing the audio feedback to the viewer indicating that the visual change has been triggered;

if a cancel change input is not received within a predetermined timeframe, then controlling the display device to display the visual change; and if the cancel change input is received within the predetermined timeframe, then controlling the display device to refrain from displaying the visual change.

2. The method of claim 1, wherein the visual change comprises switching from a first content stream comprising first content audio to a second content stream, and providing the audio feedback comprises decreasing a volume of the first content audio over the predetermined timeframe.

3. The method of claim 1, wherein a second content stream comprises second content audio, and providing the audio feedback further comprises increasing a volume of the second content audio over the predetermined timeframe.

4. The method of claim 1, wherein the audio feedback comprises an earcon.

5. The method of claim 1, wherein the first gaze location corresponds to a first content stream and the second gaze location corresponds to a second content stream.

6. The method of claim 1, wherein the cancel change input comprises the viewer changing the gaze location from the second gaze location to a third gaze location.

7. The method of claim 1, wherein the cancel change input is selected from the group consisting of a verbal command from the viewer, a plurality of eye blinks by the viewer, and a viewer gesture.

8. The method of claim 1, further comprising, based on determining that the viewer changes the gaze location to the second gaze location, providing haptic feedback to the viewer indicating that the visual change has been triggered.

9. The method of claim 8, wherein the haptic feedback is provided via a wearable computing device worn by the viewer.

10. A computing device for providing audio feedback to alert a viewer of a display device that a visual change in the display device has been triggered, the computing device comprising:

a context switching program executed by a processor of the computing device, the context switching program configured to:

receive gaze tracking data of the viewer from a gaze tracking system;

using the gaze tracking data, determine that the viewer changes a gaze location from a first gaze location to a second gaze location;

based on determining that the viewer changes the gaze location to the second gaze location, trigger the visual change;

based on determining that the viewer changes the gaze location to the second gaze location, provide the audio feedback to the viewer indicating that the visual change has been triggered;

if a cancel change input is not received within a predetermined timeframe, then control the display device to display the visual change; and if the cancel change input is received within the predetermined timeframe, then control the display device to refrain from displaying the visual change.

11. The computing device of claim 10, wherein the visual change comprises switching from a first content stream comprising first content audio to a second content stream, and providing the audio feedback comprises decreasing a volume of the first content audio over the predetermined timeframe.

12. The computing device of claim 11, wherein the second content stream comprises second content audio, and providing the audio feedback further comprises increasing a volume of the second content audio over the predetermined timeframe.

13. The computing device of claim 10, wherein the audio feedback comprises an earcon.

14. The computing device of claim 10, wherein the first gaze location corresponds to a first content stream and the second gaze location corresponds to a second content stream.

15. The computing device of claim 10, wherein the cancel change input comprises the viewer changing the gaze location from the second gaze location to a third gaze location.

16. The computing device of claim 10, wherein the cancel change input is selected from the group consisting of a verbal command from the viewer, a plurality of eye blinks by the viewer, and a viewer gesture.

17. The computing device of claim 10, wherein the context switching program is further configured to, based on determining that the viewer changes the gaze location to the second gaze location, provide haptic feedback to the viewer indicating that the visual change has been triggered.

18. The computing device of claim 17, wherein the haptic feedback is provided via a wearable computing device worn by the viewer.

19. In a computing device, a method for using non-visual feedback to alert a viewer of a display device that a visual change in the display device has been triggered, the method comprising:

receiving gaze tracking data of the viewer from a gaze tracking system;

using the gaze tracking data, determining that the viewer changes a gaze location from a first gaze location to a second gaze location;

based on determining that the viewer changes the gaze location to the second gaze location, triggering the visual change;

based on determining that the viewer changes the gaze location to the second gaze location, providing the non-visual feedback to the viewer indicating that the visual change has been triggered;

if a cancel change input is not received within a predetermined timeframe, then controlling the display device to display the visual change; and if the cancel change input is received within the predetermined timeframe, then controlling the display device to refrain from displaying the visual change.

20. The method of claim 19, wherein the non-visual feedback comprises haptic feedback.

* * * * *